(12) United States Patent
Jung et al.

(10) Patent No.: US 12,072,074 B2
(45) Date of Patent: Aug. 27, 2024

(54) LAMP FOR VEHICLE

(71) Applicant: SL Corporation, Daegu (KR)

(72) Inventors: Seunggyo Jung, Gyeongsan-si (KR); Hyunjun Cho, Gyeongsan-si (KR)

(73) Assignee: SL Corporation, Daegu (KR)

( * ) Notice: Subject to any disclaimer, the term of this patent is extended or adjusted under 35 U.S.C. 154(b) by 2 days.

(21) Appl. No.: 17/960,646

(22) Filed: Oct. 5, 2022

(65) Prior Publication Data

US 2023/0160551 A1 May 25, 2023

(30) Foreign Application Priority Data

Nov. 23, 2021 (KR) .......... 10-2021-0162553

(51) Int. Cl.
*F21S 41/265* (2018.01)
*G02B 3/00* (2006.01)

(52) U.S. Cl.
CPC .......... *F21S 41/265* (2018.01); *G02B 3/0037* (2013.01)

(58) Field of Classification Search
CPC ....... F21S 41/265; G02B 3/0037; G02B 3/08; G02B 3/0056
See application file for complete search history.

(56) References Cited

U.S. PATENT DOCUMENTS

| | | | | |
|---|---|---|---|---|
| 4,652,979 A * | 3/1987 | Arima | ...................... | F21S 43/26 362/268 |
| 5,043,856 A * | 8/1991 | Levin | ...................... | G02B 3/08 362/309 |
| 5,442,252 A * | 8/1995 | Golz | ...................... | G02B 3/02 362/309 |
| 8,727,580 B2 * | 5/2014 | Takayama | ............... | F21V 5/045 362/333 |
| 8,974,101 B2 * | 3/2015 | Koizumi | ............... | F21S 43/239 362/522 |
| 10,352,518 B2 * | 7/2019 | Lee | ......... | F21S 41/265 |
| 10,746,370 B2 * | 8/2020 | Han | ...................... | F21S 41/275 |
| 11,168,857 B2 * | 11/2021 | Lee | ......... | F21S 41/143 |
| 11,603,973 B2 * | 3/2023 | Han | ...................... | F21S 41/285 |
| 2018/0058661 A1 * | 3/2018 | Shim | ................. | G02B 19/0061 |
| 2018/0320852 A1 * | 11/2018 | Mandl | ................... | F21S 41/151 |
| 2019/0360656 A1 * | 11/2019 | Sato | ......... | F21S 41/25 |

* cited by examiner

*Primary Examiner* — Matthew J. Peerce
(74) *Attorney, Agent, or Firm* — United One Law Group LLC; Kongsik Kim; Jhongwoo Peck

(57) ABSTRACT

A lamp for vehicle includes a light source unit that generates light, and an optical unit disposed in front of the light source unit. The optical unit includes an incident surface on which the light is incident from the light source unit and an emitting surface through which the light is transmitted to form a predetermined beam pattern. The incident surface of the optical unit includes a plurality of divided regions that are divided in a grid shape, and the plurality of divided regions include at least a first divided region and a second divided region having different distances from a center line that connects centers of the incident surface and the emitting surface of the optical unit. In particular, the first divided region and the second divided region are formed to have different inclination angles with respect to a vertical plane in at least one direction.

13 Claims, 14 Drawing Sheets

LAMP FOR VEHICLE

CROSS-REFERENCE TO RELATED APPLICATION

This application claims priority from Korean Patent Application No. 10-2021-0162553, filed on Nov. 23, 2021, which application is incorporated herein by reference in its entirety.

BACKGROUND

1. Technical Field

The present disclosure relates to a vehicle lamp, and more particularly, to a vehicle lamp for forming a beam pattern of uniform brightness.

2. Description of the Related Art

In general, a vehicle is provided with a lamp for the purpose of illumination function for easily identifying an object located around the vehicle during low-light conditions (e.g., night driving) and signaling function for notifying other vehicles or road users of the driving state of the vehicle.

For example, head lamps and fog lamps are mainly for the purpose of illumination, and turn signal lamps, tail lamps and brake lamps are mainly for the purpose of signaling. The installation standards and specification of each lamp are stipulated by laws and regulations so that each function can be fully exhibited.

In recent years, not only the functional aspect of enabling the driver's visibility for safe driving, which is the basic role of a vehicle lamp, but also the aesthetic aspect that consumers perceive has a great influence on the purchase decision of a vehicle.

To this end, there is a need for a means of using a plurality of miniaturized lamps instead of using a single lamp module to realize a slimmer form factor and to form an optimal beam pattern.

SUMMARY

An object of the present disclosure is to provide a vehicle lamp that allows a beam pattern of uniform brightness to be formed as a whole. Objects of the present disclosure are not limited to the objects mentioned above, and other objects not mentioned will be clearly understood by those skilled in the art from the following description.

According to an aspect of the present disclosure, a vehicle lamp may include a light source unit that generates light, and an optical unit disposed in front of the light source unit. The optical unit may include an incident surface on which the light is incident from the light source unit and an emitting surface through which the light is transmitted to form a predetermined beam pattern. The incident surface of the optical unit may include a plurality of divided regions that are divided in a grid shape, and the plurality of divided regions may include at least a first divided region and a second divided region having different distances from a center line that connects centers of the incident surface and the emitting surface of the optical unit. The first divided region and the second divided region may be formed to have different inclination angles with respect to a vertical plane in at least one direction.

The plurality of divided regions may convert the light incident from the light source unit into parallel light. Among the plurality of divided regions, two divided regions disposed on opposite sides with respect to the center line may be formed to have a same inclination angle with respect to the vertical plane. In each of the first divided region and the second divided region, a distal end that is farther from the center line may be disposed more forward compared to a proximate end that is closer to the center line.

The second divided region may have a greater distance from the center line than the first divided region, and the second divided region may have a greater inclination angle than an inclination angle of the first divided region with respect to the vertical plane.

A plurality of optical patterns corresponding to the plurality of divided regions may be formed on the emitting surface of the optical unit. The plurality of divided regions and the plurality of optical patterns may correspond to each other one-to-one. Each of the plurality of optical patterns may have a curved shape that is convex forward. Further, each of the plurality of optical patterns may have different radii of curvature in different directions. For example, each of the plurality of optical patterns may have a radius of curvature in a horizontal direction different from a radius of curvature in a vertical direction.

The light source unit may include a plurality of light sources for generating light of different colors, and any one of the plurality of light sources may be disposed at a different distance from the center line than the rest of the plurality of light sources.

According to the vehicle lamp of the present disclosure as described herein, there are one or more of the following effects. A beam pattern of substantially uniform brightness can be formed as a whole because unnecessary dark zones can be prevented due to a configuration of one-to-one correspondence between the divided region where light is incident from the light source and the optical pattern from which the light incident to the divided region is emitted. The effects of the present disclosure are not limited to the effects mentioned above, and other effects not mentioned will be clearly understood by those skilled in the art from the description of the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
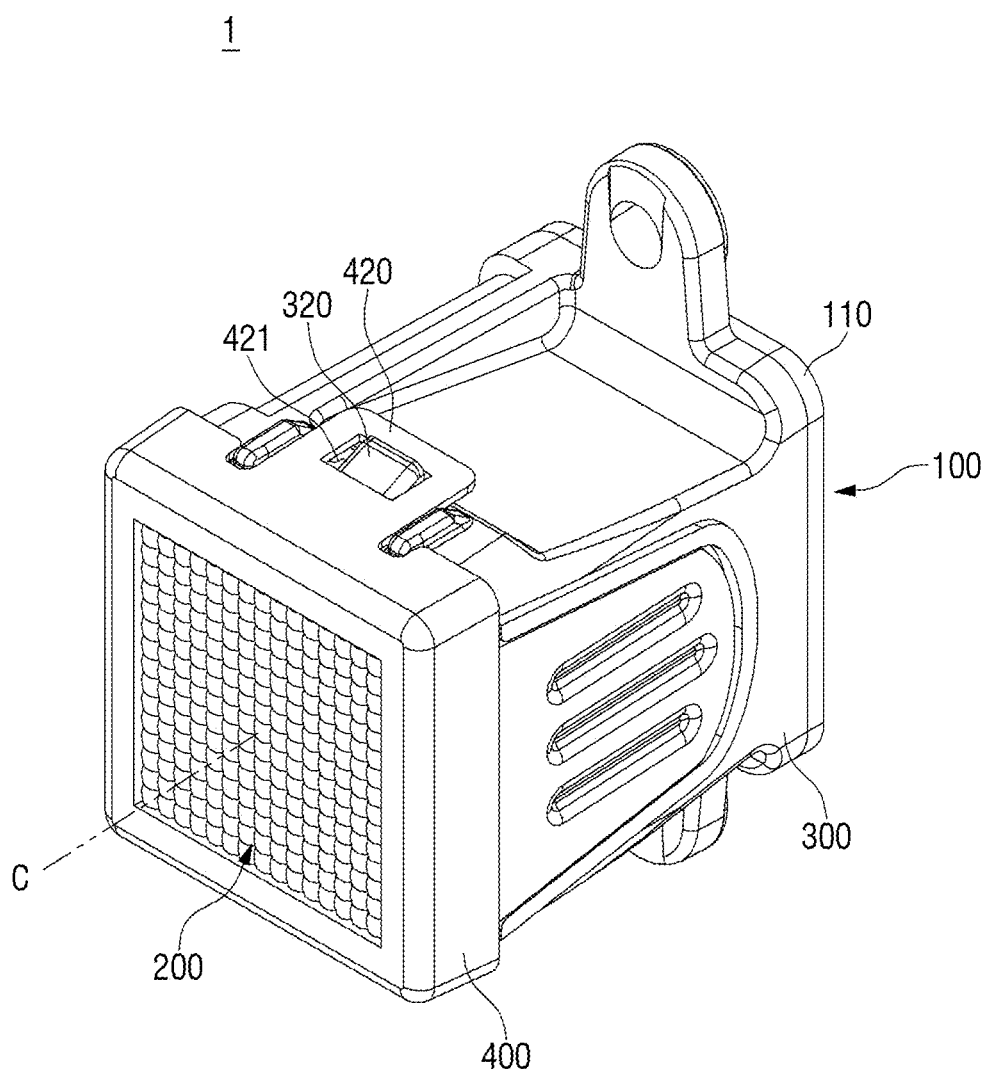
FIGS. 1 and 2 are perspective views showing a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining a vehicle lamp according to embodiments of the present disclosure.

Figure 2:
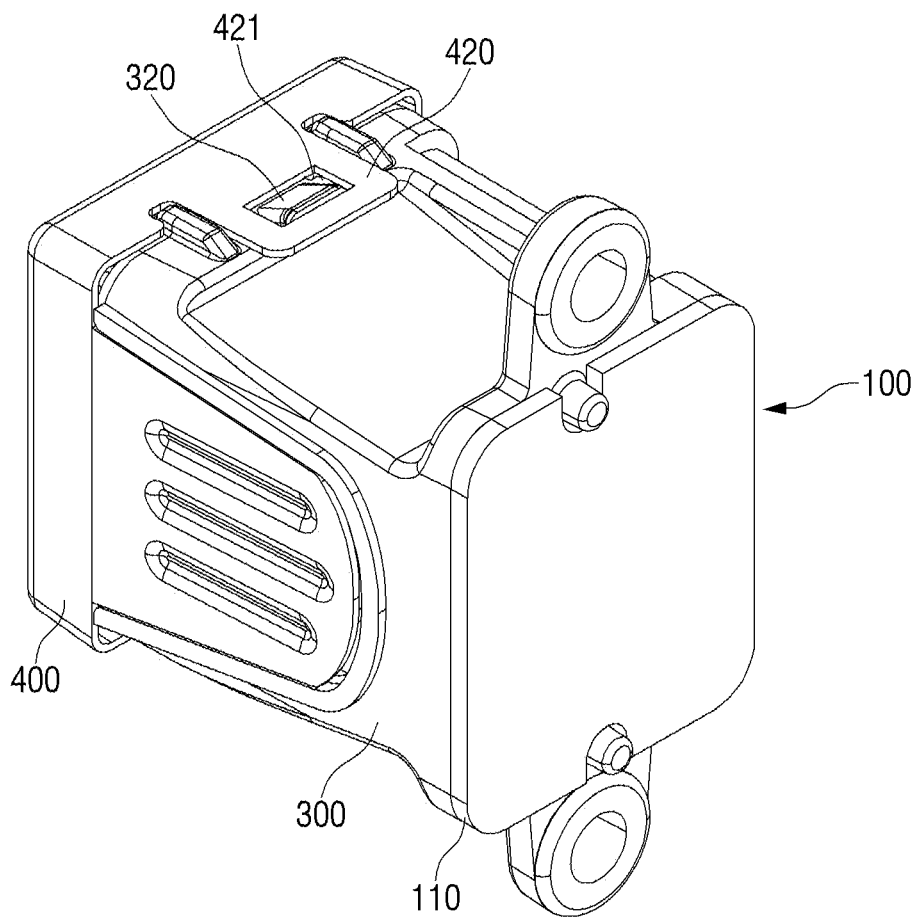
Figure 3:
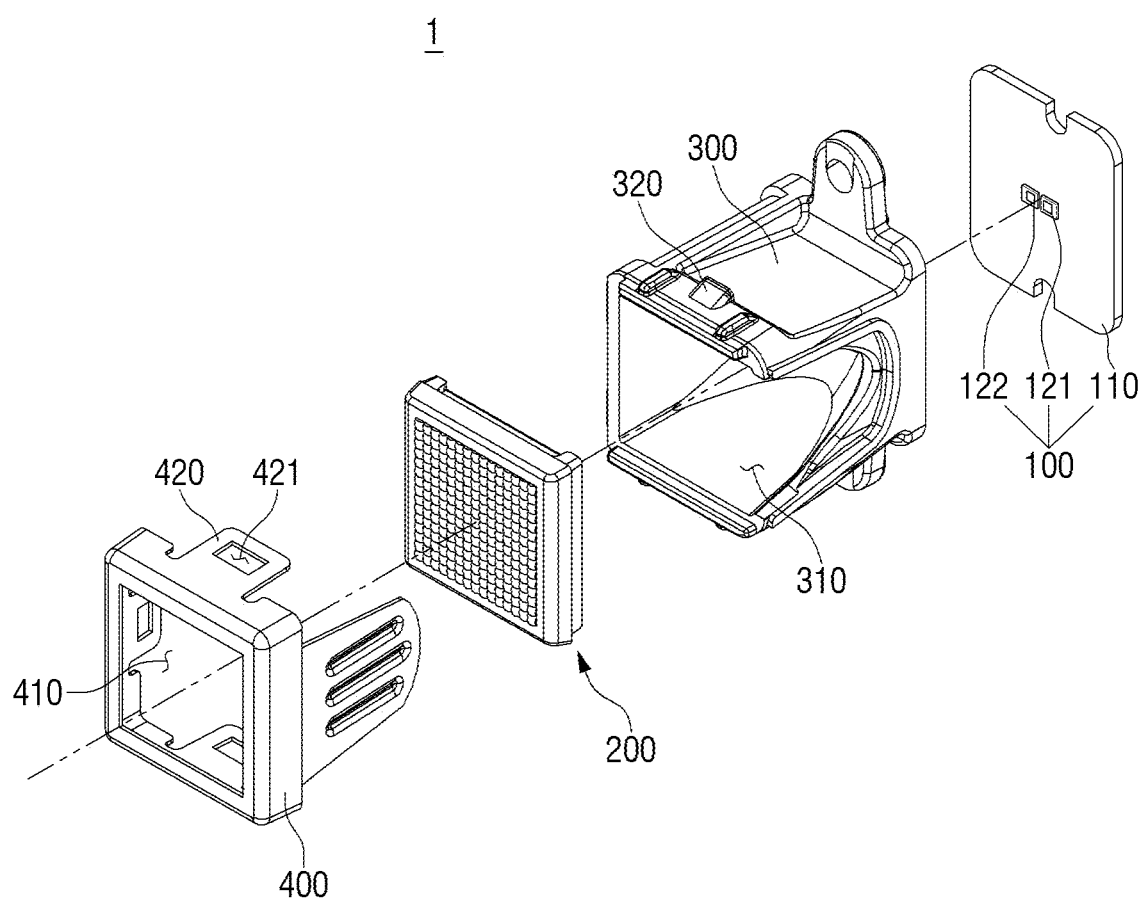
FIGS. 3 and 4 are exploded perspective views showing a vehicle lamp according to an embodiment of the present disclosure.
Figure 4:
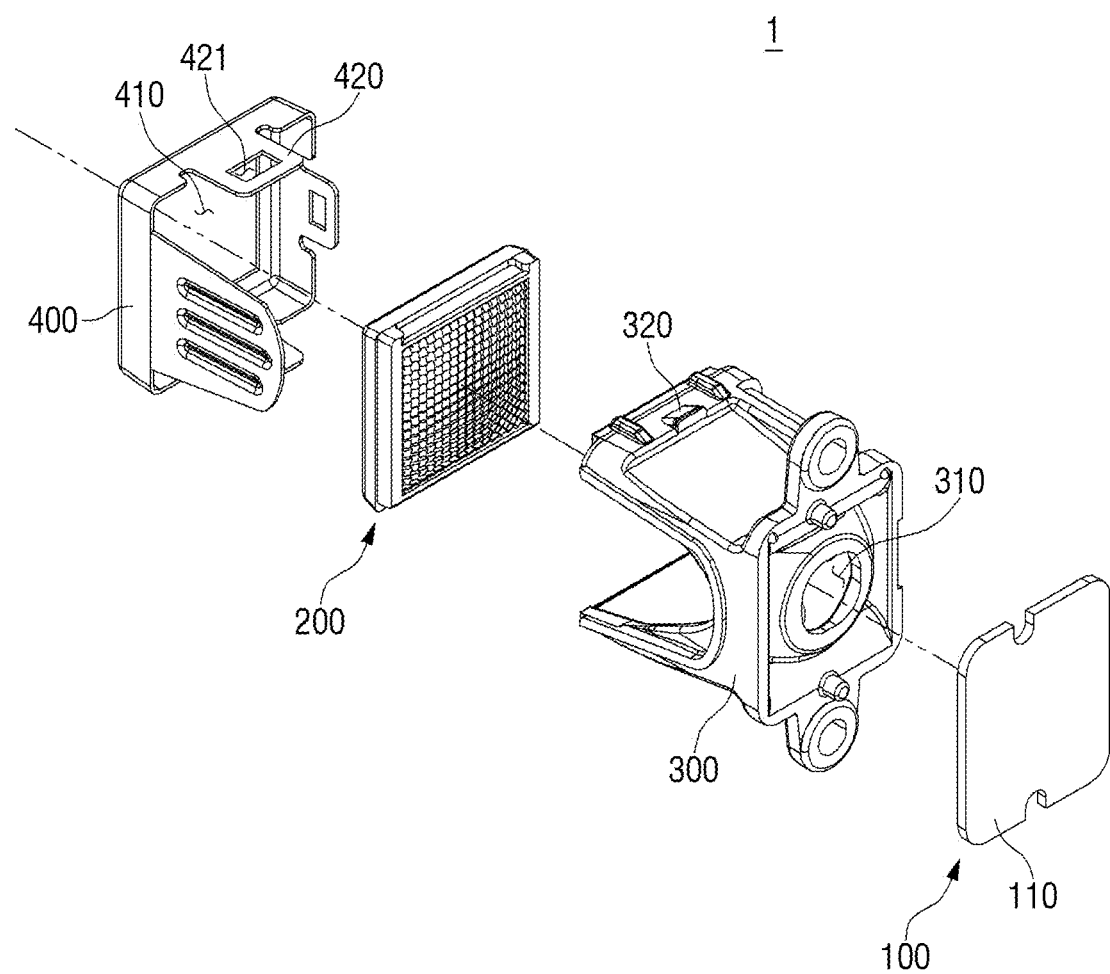

FIGS. 1 and 2 are perspective views illustrating a vehicle lamp according to an embodiment of the present disclosure, and FIGS. 3 and 4 are exploded perspective views showing a vehicle lamp according to an embodiment of the present disclosure.

Referring to FIGS. 1 to 4, a vehicle lamp 1 according to an embodiment of the present disclosure may include a light source unit 100 and an optical unit 200.

In the embodiment of the present disclosure, an example in which the vehicle lamp 1 is used for the purpose of a signaling function that can inform surrounding vehicles or pedestrians of the driving state of the vehicle, such as a daytime running lamp (DRL), a turn signal lamp, a position lamp, and the like, is described. However, the present disclosure is not limited thereto, and the vehicle lamp 1 of the present disclosure may be used for the purpose of various lamps installed in a vehicle having an illumination function or a signaling function.

In particular, two or more of the vehicle lamp 1 of the present disclosure may be used and arranged in at least one direction according to the design consideration so that a desired beam pattern may be formed while a slim form factor is implemented.

The light source unit 100 may include a substrate 110 and one or more light sources 121 and 122 that are installed on the substrate 110. In the embodiment of the present disclosure, the light source unit 100 may include a plurality of light sources 121 and 122 that emit light having different colors. Hereinafter, in the embodiment of the present disclosure, the plurality of light sources 121 and 122 will be referred to as a first light source 121 and a second light source 122, respectively.

In particular, the reason that the light source unit 100 includes a plurality of light sources 121 and 122 may be to enable the vehicle lamp 1 of the present disclosure to be used for two or more purposes. For example, yellow light may be generated from the first light source 121, and white light may be generated from the second light source 122. As such, depending on the purpose of the vehicle lamp 1 of the present disclosure, light may be generated from at least one of the first light source 121 or the second light source 122.

The number of light sources and the color of light included in the light source unit 100 are not limited to the above-described examples, and the number of light sources and/or the color of light included in the light source unit 100 may vary according to the purpose of the vehicle lamp 1 of the present disclosure. Even when the vehicle lamp 1 of the present disclosure is used for a single purpose, two or more light sources that emit light of the same color may be included so that the required amount of light may be satisfied.

The optical unit 200 may form a beam pattern suitable for the purpose of the vehicle lamp 1 of the present disclosure by allowing the light generated from the light source unit 100 to be transmitted and irradiated to exterior of the vehicle. The position of the optical unit 200 may be fixed by a light guide unit 300, in which a guide aperture 310 is formed to allow the light generated from the light source unit 100 to be guided to the optical unit 200, and a holder 400 coupled to the front of the light guide unit 300. An opening 410 may be formed in the holder 400 to allow the light emitted from the optical unit 200 to pass therethrough. At least one coupling unit 420 that extends rearwardly may be formed on the edge of the holder 400, and at least one coupling protrusion 320 may be formed in the light guide unit 300 to be inserted into a coupling groove 421 formed in the at least one coupling unit 420. However, the present disclosure is not limited thereto, and a coupling protrusion 320 may be formed in any one of the light guide unit 300 or the holder 400, and a coupling groove 421 may be formed in the other of the light guide unit 300 or the holder 400.

In the embodiment of the present disclosure, an example in which the light guide unit 300 and the holder 400 are coupled by at least one coupling protrusion 320 and at least one coupling groove 421 is described. However, this is merely an example for helping understanding of the disclosure, and the present disclosure is not limited thereto. The light guide unit 300 and the holder 400 may be coupled by various methods such as hook coupling, screw coupling, adhesive, and the like. When the light guide unit 300 and the holder 400 are coupled, the edge of an incident surface 210 of the optical unit 200 and the edge of an emitting surface of the optical unit 200 may be disposed to be in contact with the front end of the light guide unit 300 and the rear end of the holder 400, respectively, so that the position of the optical unit 200 may be fixed.

Figure 5:
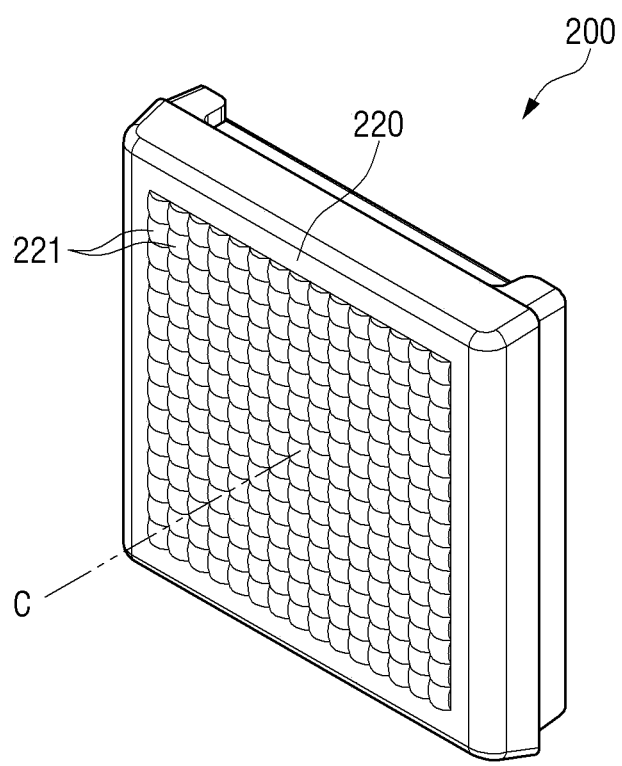
FIGS. 5 and 6 are perspective views showing an optical unit according to an embodiment of the present disclosure.
Figure 6:
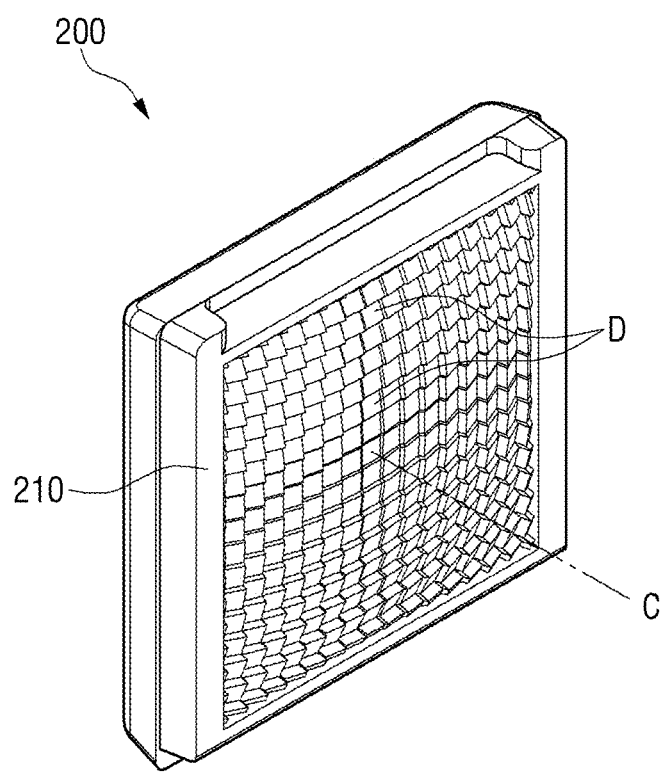
Figure 7:
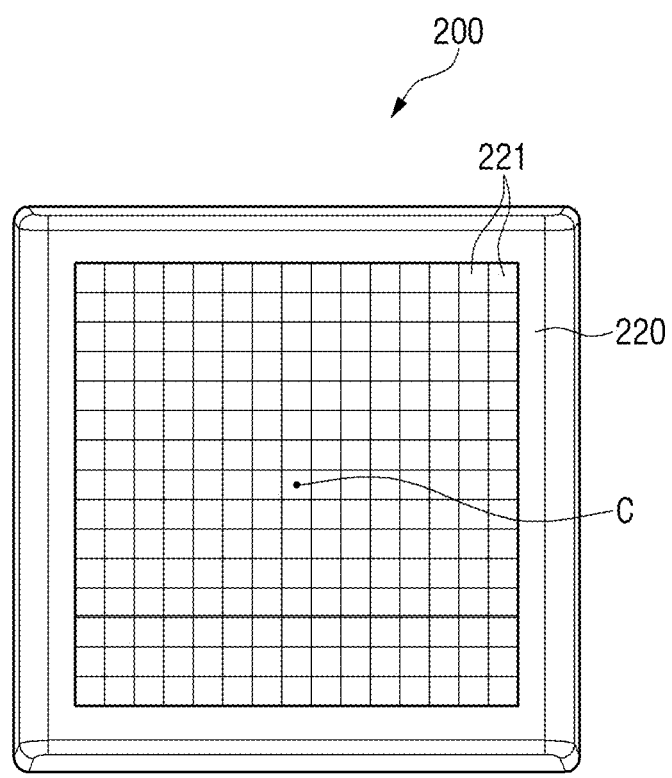
FIG. 7 is a front view showing an optical unit according to an embodiment of the present disclosure.
Figure 8:
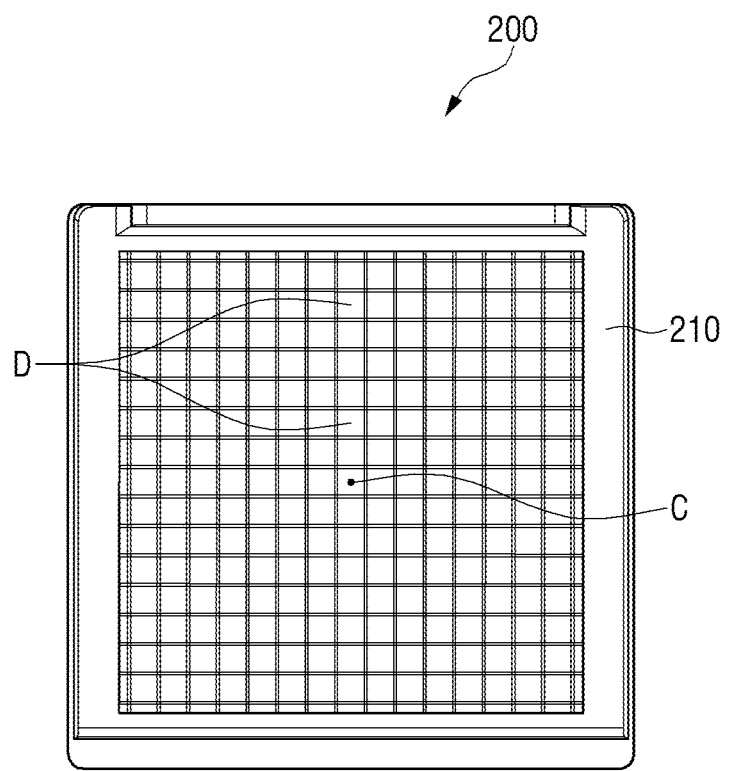
FIG. 8 is a rear view showing an optical unit according to an embodiment of the present disclosure.

FIGS. 5 and 6 are perspective views showing an optical unit according to an embodiment of the present disclosure, FIG. 7 is a front view showing an optical unit according to an embodiment of the present disclosure, and FIG. 8 is a rear view showing an optical unit according to an embodiment of the present disclosure.

Referring to FIGS. 5 to 8, an incident surface 210 of the optical unit 200, on which the light is incident from the light source unit 100, may be divided into a plurality of divided regions D that are arranged in a grid shape. In particular, the plurality of divided regions D may be formed to have different inclination angles in at least one direction depending on a separation distance and direction with respect to a center line C that connects the center of the incident surface 210 of the optical unit 200 and the center of the emitting surface 220 of the optical unit 200 so that the light incident from the light source unit 100 may be converted into parallel light.

The plurality of divided regions D may be disposed to be symmetrical vertically and/or horizontally with respect to the center line C of the optical unit 200, and thus the divided regions disposed on the opposite side with respect to the center line C of the optical unit 200 among the plurality of divided regions D may be formed to have the same inclination angle.

Figure 9:
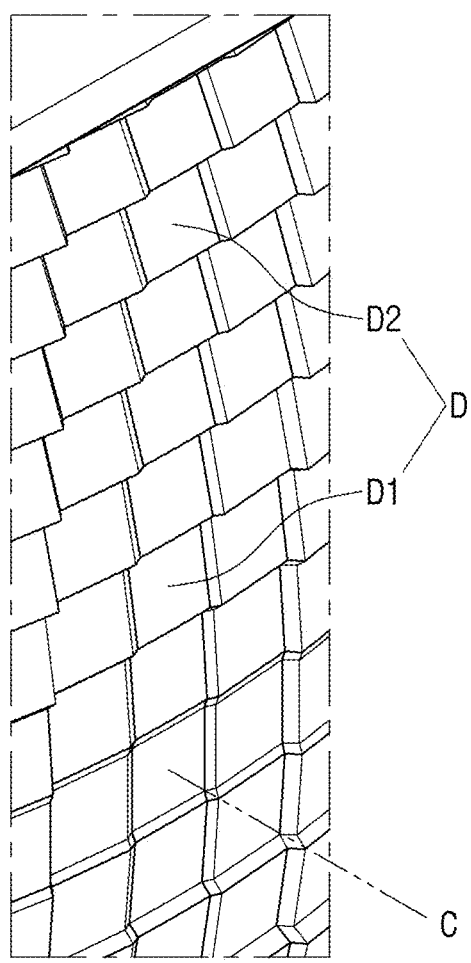
FIGS. 9 and 10 are schematic views showing divided regions having different separation distances from the center line of the optical unit according to an embodiment of the present disclosure.
Figure 10:
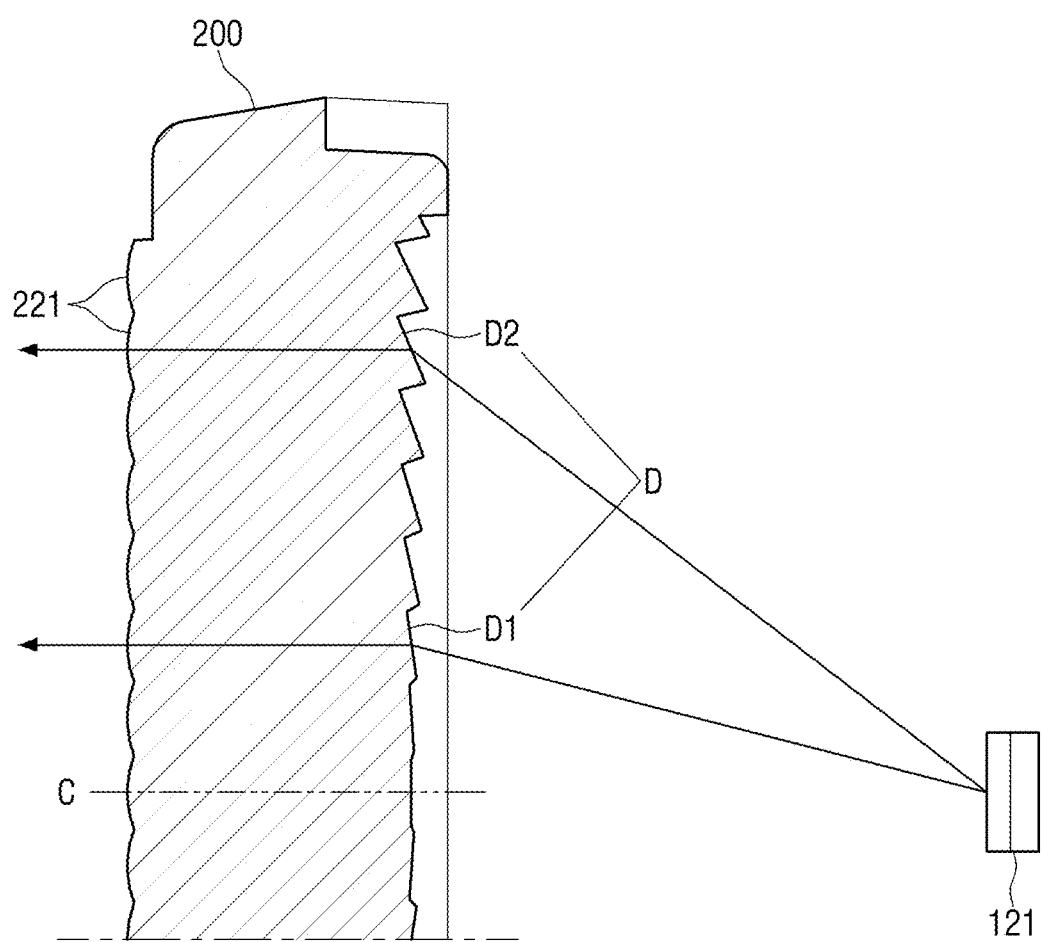

In the embodiment of the present disclosure, since the plurality of divided regions D are divided in a grid shape, the plurality of divided regions D may be understood as being formed to have different inclination angles in the left-right direction, the up-down direction, or a combined direction thereof depending on the separation distance and direction with respect to the center line C of the optical unit 200. The expression that the plurality of divided regions D have different inclination angles depending on the separation distance from the center line C of the optical unit 200 may be understood that, as shown in FIGS. 9 and 10, a first divided region D1 having a first separation distance from the center line C of the optical unit 200 and a second divided region D2 having a second separation distance greater than the first separation distance from the center line C of the optical unit 200 may have different inclination angles. Herein, the first divided region D1 and the second divided region D2 may collectively refer to two divided regions having different separation distances from each other in the radial direction from the center line C of the optical unit 20.

Each of the plurality of divided regions D may be formed to be inclined so that an end closer to the center line C may be disposed more forward than an end farther from the center line C. More specifically, the plurality of divided regions D may be formed to have a greater inclination angle as they go away from the center line C in the radial direction with respect to the center line C. In other words, among the plurality of divided regions D, a divided region that is disposed farther from the center line C may have a greater distance between both ends (e.g., the upper end and the lower end) along the front-rear direction.

In the embodiment of the present disclosure, the plurality of divided regions D may be formed to have a greater inclination angle as they are located farther from the center line C in the radial direction with respect to the center line C. Due to this configuration, the light incident from the light source unit 100 to a point farther from the center line C may be refracted at a greater refraction angle. For example, when the first divided region D1 is disposed farther upward from the center line C than the second divided region D2, the vertical inclination angle of the first divided region D1 with respect to the vertical plane may be set to be greater than the vertical inclination angle of the second divided region D2. When the first divided region D1 is disposed farther rightward from the center line C than the second divided region D2, the horizontal inclination angle of the first divided region D1 with respect to the vertical plane may be set to be greater than the horizontal inclination angle of the second divided region D2. Further, when the first divided region D1 is disposed farther upward and farther rightward, both the vertical inclination angle and the horizontal inclination angle of the first divided region D1 with respect to the vertical plane may be set to be greater than the vertical inclination and the horizontal inclination angle of the second divided region D2, respectively.

Accordingly, as the light incident from the light source unit 100 to the optical unit 200 is farther away from the center line C of the optical unit 200, the angle of refraction may gradually increase, and thus the light incident on the incident surface 210 of the optical unit 200 may be converted into parallel light as a whole. Although FIG. 10 depicts an example of light incident from the first light source 121 to the optical unit 200, the second light source 122 may be applied similarly as the first light source 121.

A plurality of optical patterns 221 corresponding to each of the plurality of divided regions D may be formed on the emitting surface 220 of the optical unit 200, and in the embodiment of the present disclosure, the plurality of divided regions D and the plurality of optical patterns 221 may be formed to correspond to each other one-to-one. With such a configuration, unnecessary dark zones due to the boundary line between the divided regions adjacent to each other among the plurality of divided regions D may not be formed, unlike a configuration where two or more of the plurality of optical patterns 221 correspond to any one of the plurality of division regions D.

Figure 11:
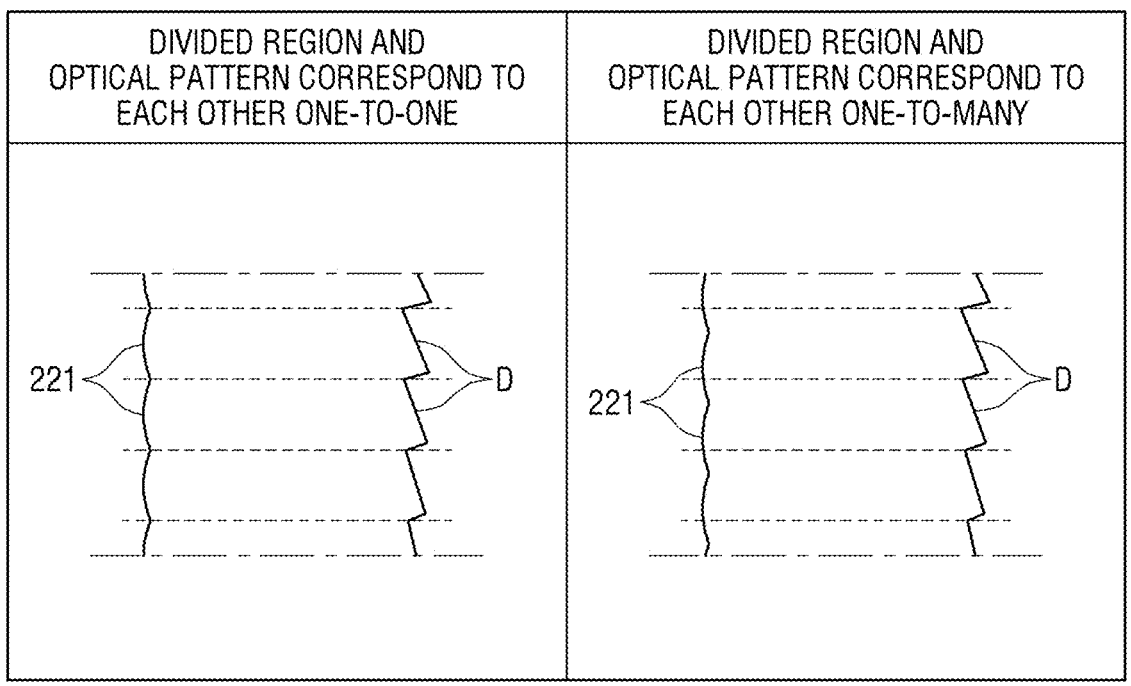
FIG. 11 is a schematic diagram illustrating divided regions and optical patterns corresponding to each other one-to-one according to an embodiment of the present disclosure.

In other words, when the plurality of divided regions D and the plurality of optical patterns 221 correspond to each other one-to-one as shown in FIG. 11, since the boundary (broken lines) between the divided regions adjacent to each other among the plurality of divided regions D and the boundary between the adjacent optical patterns among the plurality of optical patterns 221 are the same, a dark zone may be prevented from being formed due to the boundary between the adjacent divided regions among the plurality of divided regions D (see left column of FIG. 11). On the other hand, when the plurality of divided regions D and the plurality of optical patterns 221 correspond to each other one-to-many, that is, when two or more of the plurality of optical patterns 221 correspond to one of the plurality of divided regions D, there is a high possibility that a dark zone is generated due to a boundary (dotted line) between divided regions adjacent to each other among the plurality of divided regions D (see right column of FIG. 11).

The plurality of optical patterns 221 may diffuse the light so that a beam pattern of an appropriate size may be formed by the light that is incident on the incident surface 210 and emitted. To this end, the plurality of optical patterns 221 may have a curved shape that is convex forward. In particular, the plurality of optical patterns 221 may be formed to have different radii of curvature in different directions with respect to the center line C based on the size or shape of the beam pattern to be formed by the vehicle lamp 1 of the present disclosure.

Figure 12:
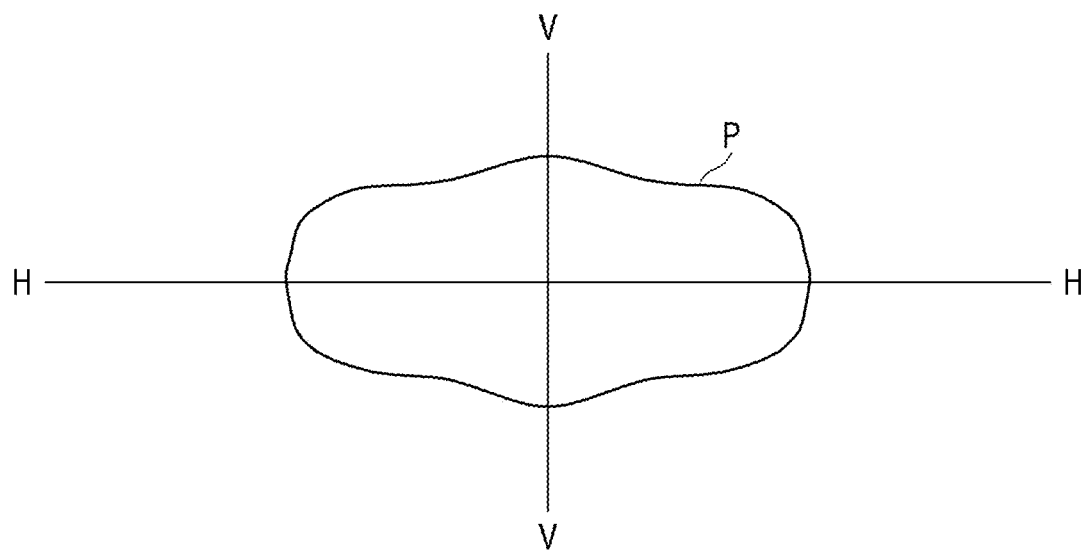
FIG. 12 is a schematic view showing a beam pattern formed by a vehicle lamp according to an embodiment of the present disclosure.
Figure 13:
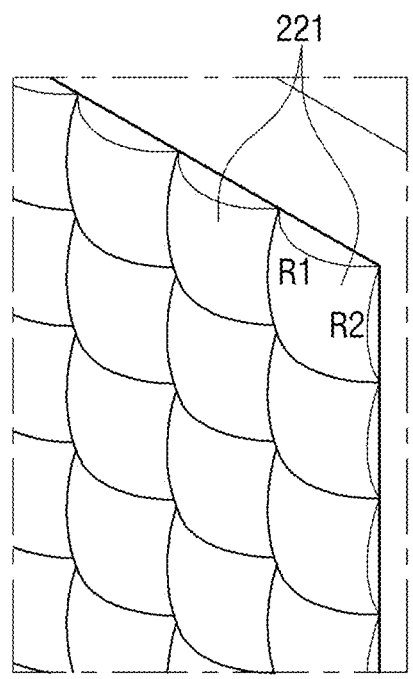
FIG. 13 is a schematic diagram showing an optical pattern according to an embodiment of the present disclosure.

For example, when a beam pattern P having a larger width in the left-right direction than a height in the up-down direction is to be formed by the vehicle lamp 1 of the present disclosure as shown in FIG. 12, the light may be diffused more in the left-right direction. Accordingly, by forming the radius of curvature R1 in the left-right direction to be smaller than the radius of curvature R2 in the up-down direction as shown in FIG. 13, a beam pattern having a larger size in the left-right direction than in the up-down direction may be formed as shown in FIG. 12.

The radius of curvature of each of the plurality of optical patterns 221 is not limited to the above-described example, and the plurality of optical patterns 221 may be formed to have different radii of curvature in at least one direction based on the shape and/or size of the beam pattern to be formed by the vehicle lamp 1 of the present disclosure.

On the other hand, in the embodiment of the present disclosure, the vehicle lamp 1 may include a first light source 121 and a second light source 122 so that they can be used together for two or more purposes, and based on the intensity of light required according to each purpose, the first light source 121 and the second light source 122 may be disposed at different distances from the center line C of the optical unit 200.

Figure 14:
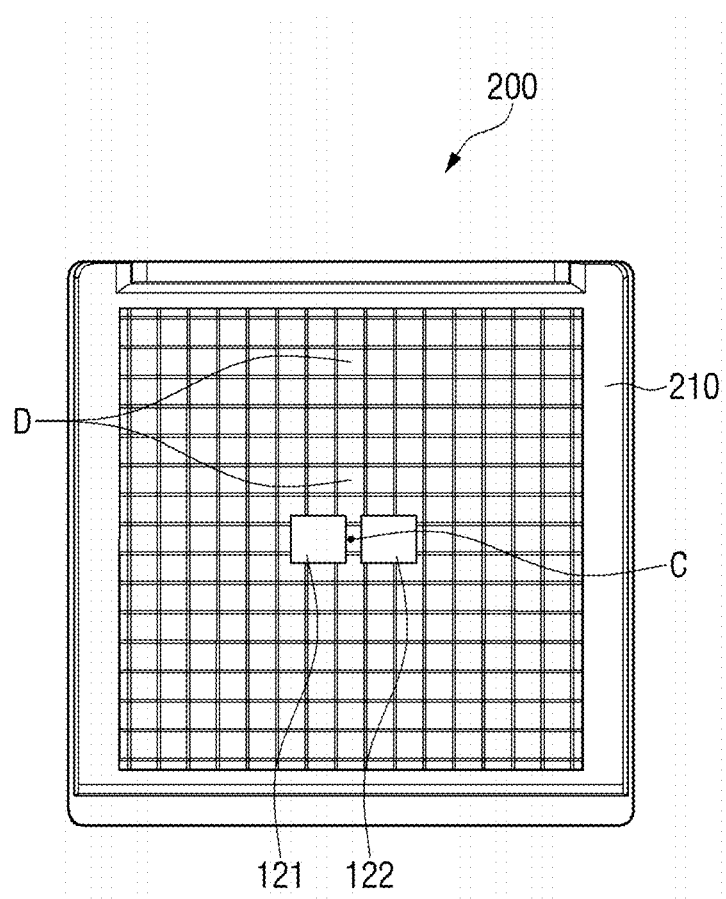
FIG. 14 is a schematic diagram illustrating positions of a plurality of light sources according to an embodiment of the present disclosure.

For example, when a higher intensity of yellow light than white light is required, the first light source 121 configured to generate yellow light may be disposed closer to the center line C of the optical unit 200 compared to the second light source 122 configured to generate white light, as shown in FIG. 14.

As described above, in the vehicle lamp 1 of the present disclosure, the plurality of divided regions D of the incident surface 210 of the optical unit 200 and the plurality of optical patterns 221 of the emitting surface 220 of the optical unit 200 may correspond to one another one-to-one as described above, so that unnecessary dark zones are prevented from being formed in the light generated from at least one of the plurality of optical patterns 221, thereby forming a beam pattern of substantially uniform brightness and preventing deterioration of optical efficiency.

In concluding the detailed description, those skilled in the art will appreciate that many variations and modifications can be made to the exemplary embodiments without substantially departing from the principles of the present disclosure. Therefore, the disclosed exemplary embodiments of the disclosure are used in a generic and descriptive sense only and not for purposes of limitation.

What is claimed is:

1. A lamp for a vehicle comprising:
a light source unit that generates light; and
an optical unit disposed in front of the light source unit,
wherein the optical unit includes an incident surface on which the light is incident from the light source unit and an emitting surface through which the light is transmitted to form a predetermined beam pattern,
wherein the incident surface of the optical unit includes a plurality of divided regions that are divided in a grid shape,
wherein the plurality of divided regions include at least a first divided region and a second divided region having different distances from a center line that connects centers of the optical unit and the light source unit,
wherein the first divided region and the second divided region are formed to have different inclination angles with respect to a vertical plane in at least one direction such that both of the first divided region of the incident surface and the second divided region of the incident surface refract the light to be substantially parallel with the center line,
wherein a distance from the center line to the second divided region is greater than a distance from the center line to the first divided region,
wherein an inclination angle of the second divided region is greater than an inclination angle of the first divided region with respect to the vertical plane,
wherein a distal end of the second divided region is disposed longitudinally more forward than a distal end of the first divided region, and
wherein a distal end of a third divided region, which is disposed on an opposite side from the second divided region with respect to the center line, and the distal end of the second divided region are disposed at a substantially same longitudinal position.

2. The lamp of claim 1, wherein the plurality of divided regions convert the light incident from the light source unit into parallel light.

3. The lamp of claim 1, wherein, in each of the first divided region and the second divided region, a distal end that is farther from the center line is disposed more forward compared to a proximate end that is closer to the center line.

4. The lamp of claim 1, wherein the second divided region has a greater distance from the center line than the first divided region, and
wherein the second divided region has a greater inclination angle than an inclination angle of the first divided region with respect to the vertical plane.

5. The lamp of claim 1, wherein a plurality of optical patterns corresponding to the plurality of divided regions are formed on the emitting surface of the optical unit.

6. The lamp of claim 5, wherein the plurality of divided regions and the plurality of optical patterns correspond to each other one-to-one.

7. The lamp of claim 5, wherein each of the plurality of optical patterns has a curved shape that is convex forward.

8. The lamp of claim 5, wherein each of the plurality of optical patterns has different radii of curvature in different directions.

9. The lamp of claim 8, wherein the each of the plurality of optical patterns has a radius of curvature in a horizontal direction different from a radius of curvature in a vertical direction.

10. The lamp of claim 1, wherein the light source unit includes a plurality of light sources for generating light of different colors.

11. The lamp of claim 10, wherein any one of the plurality of light sources is disposed at a distance different from the center line from rest of the plurality of light sources.

12. The lamp of claim 1, further comprising:
a guide frame coupled to the optical unit to guide the light generated from the light source to the optical unit.

13. The lamp of claim 1, wherein, among the plurality of divided regions, two divided regions disposed on opposite sides with respect to the center line are formed in mirror images to be vertically and horizontally symmetrical with respect to the center line.

* * * * *